United States Patent

[11] 3,534,709

| | | |
|---|---|---|
| [72] | Inventor | Clayton B. Thompson,<br>Fort Worth, Texas (Rte. 1, Box 104,<br>Mansfield, Tex. 76063) |
| [21] | Appl. No. | 744,223 |
| [22] | Filed | July 11, 1968 |
| [45] | Patented | Oct. 20, 1970 |

[54] SYSTEM AND APPARATUS FOR FEEDING LIVESTOCK
4 Claims, 16 Drawing Figs.

[52] U.S. Cl. .................................................. 119/56, 222/56
[51] Int. Cl. .................................................. A01k 05/02
[50] Field of Search .......................................... 119/51, 52, 56, 53, 148, 147; 222/56

[56] References Cited
UNITED STATES PATENTS

| 980,163 | 12/1910 | Moore | 119/148 |
|---|---|---|---|
| 1,519,429 | 12/1924 | Yaggy | 119/148 |
| 2,942,574 | 6/1960 | Golay | 119/52X |
| 3,180,318 | 5/1965 | Fisher | 119/56 |
| 3,199,731 | 8/1965 | Brauer et al. | 222/56 |
| 3,225,742 | 12/1965 | Hagans | 119/56X |
| 3,242,905 | 3/1966 | Haen | 119/56 |
| 3,310,033 | 3/1967 | Eichholz | 119/56 |
| 3,325,055 | 6/1967 | Marshall | 119/56X |

*Primary Examiner*—Aldrich F. Medbery
*Attorney*—Cecil L. Wood

ABSTRACT: A system and apparatus for feeding livestock, particularly dairy cattle, including conveyor means for automatically distributing feed along one or more feeding bunkers or troughs which is deposited at spaced stations in predetermined quantities, and providing means at each station for measuring the amount of feed deposited thereat according to the requirement for each individual animal.

The invention further includes adjustable stanchions at each station for restraining the animal while feeding and providing means for operating the stanchions to release the animals after a predetermined interval of feeding, such operating means, as well as the means for controlling the distribution of the feed, being located remotely from the stanchioned stations.

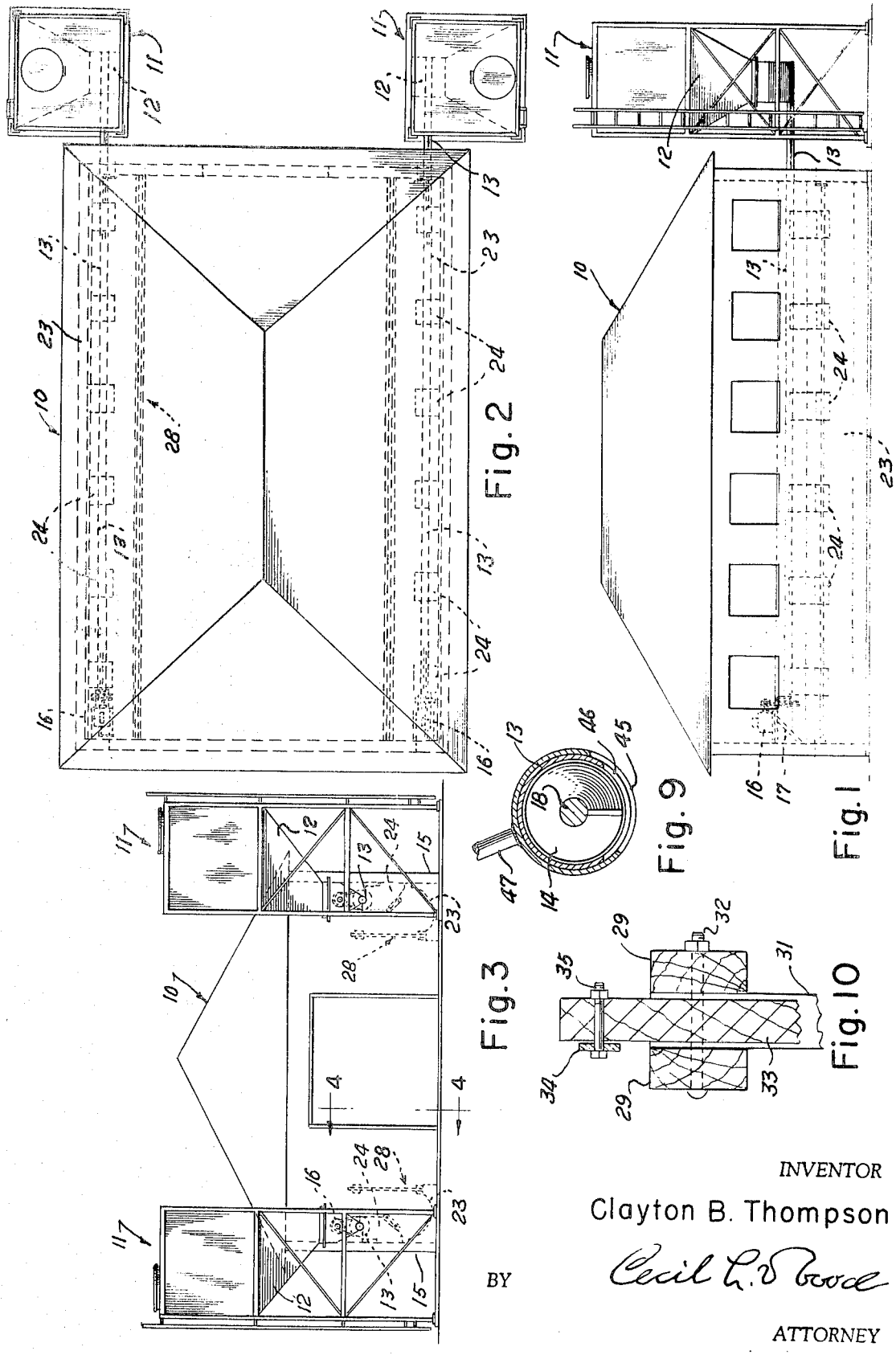

INVENTOR
Clayton B. Thompson

BY

ATTORNEY

INVENTOR
Clayton B. Thompson

BY Cecil L. Wood
ATTORNEY 3,534,709

SYSTEM AND APPARATUS FOR FEEDING LIVESTOCK

SUMMARY OF THE INVENTION

This invention relates to a system and apparatus for feeding livestock, and it has particular reference to the feeding and retention of dairy cattle during milking operations.

A prime object of the invention resides in the provision of semiautomatic mechanisms by which livestock, and especially dairy animals, can be efficiently fed and handled during milking operations, and by which each individual animal can be apportioned its prescribed amount of feed, and while feeding, be restrained during the process of milking the animal.

Another object of the invention is that of providing an effective means of alleviating the burden of the dairy farmer by affording a system whereby the feeding operation can be efficiently performed with a minimum of effort and time consumed, and providing means for conveying or distributing the feed to the animals in accordance with their individual requirements.

It is common knowledge that dairy farming is an arduous undertaking, requiring the application of much time and labor. The invention is designed to improve the economics of the industry by minimizing the effort required in performing the various operations attendant upon the feeding of the productive animals and the production of milk therefrom by providing mechanical means for performing the operations normally performed manually. Since practically all milking operations are accomplished by machines it is desirable to implement such operations by mechanical feeding and retention devices.

Broadly, the invention contemplates the provision of mechanical means by which the feeding of livestock can be expedited by conveying the feed directly from storage bins to the animals and deposited at individual stations in measured quantities, and mechanically restraining the individual animals while feeding and during the milking process.

DESCRIPTION OF THE DRAWINGS

While the foregoing objects are paramount, other and lesser objects will become apparent as the description proceeds when considered in connection with the appended drawings wherein:

FIG. 1 is an elevational view of a building and elevated feed bins representing a typical installation of the invention.

FIG. 2 is a plan view of such facility.

FIG. 3 is a front elevational view of the structures shown in FIGS. 1 and 2.

FIG. 9 is a fragmentary transverse sectional view, on line 9-9 of FIG. 8, through the flight conveyor.

FIG. 10 is a fragmentary view, on an enlarged scale, through the upper structure of one of the stanchion assemblies, shown in FIGS. 4, 5 and 6.

DETAILED DESCRIPTION

Figure 7:
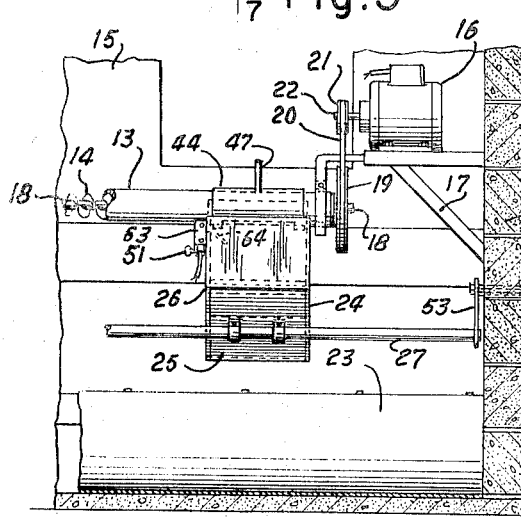
FIG. 7 is a fragmentary sectional view, on line 7-7 of FIG. 5, showing one of the feed dispensing hoppers in front elevation and showing a portion of the feed conveyor and the motor driving the same.
Figure 8:
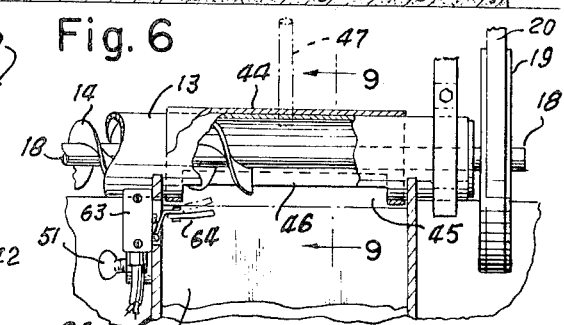
FIG. 8 is a fragmentary enlarged view, on line 8-8 of FIG. 5, partially in section and broken away, showing the terminal end of the flight conveyor and its conduit, a sectional portion of a dispensing hopper, and a microswitch for controlling the conveyor circuit.

The invention is adapted to be installed indoors or outdoors, as best adapted to the particular requirements, but it is desirable to install the system embodying the invention in a building, such as illustrated in FIGS. 1, 2 and 3 of the drawings, in which is illustrated a typical dairy barn 10. Adjacent to the building is shown a pair of elevated feed bins 11, one of which is arranged on each side of the building 10, each having a discharge chute 12 having an outlet conduit 13 enclosing a flight conveyor 14, both of which extend along opposite walls 15 of the building 10 in a typical installation. The flight conveyors 14 are driven by electric motors 16 supported on frames 17 at one end of the building 10. The conveyor shafts 18 have V-pulleys 19 thereon on which V-belts 20 are arranged and which encompass V-pulleys 21 on the motor shafts 22, as shown in FIGS. 4, 5 and 7.

Along each wall 15 of the building 10 is arranged a trough or bunker 23 into which the feed dispensed from the bins 11 is deposited through individual dispensers 24 spaced along the bunkers 23 and secured to the walls 15, as shown in broken lines in FIGS. 1, 2 and 3, and in section in FIGS. 5, 6, 7, 11 and 12. Each of the dispensers 24 has an inclined drop bottom 25, hinged at 26 on the front wall thereof, and capable of being opened and closed through the medium of a shaft 27 extending through the entire length of the series of dispensers 24, as shown in FIGS. 4, 5, 6, 7, 11 and 12, and which will be described presently in greater detail.

Figure 4:
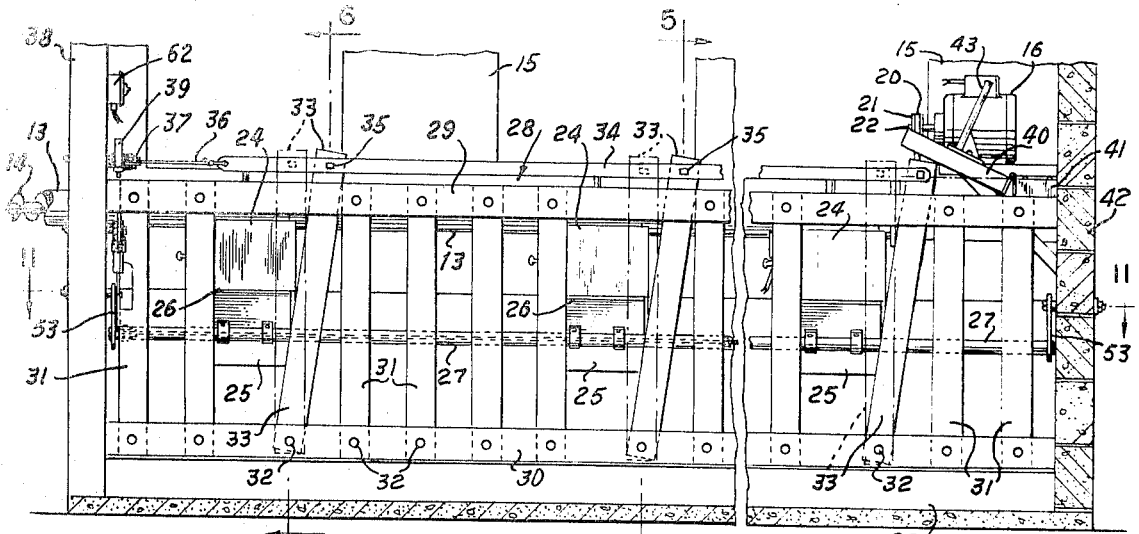
FIG. 4 is a sectional view, on line 4-4 of FIG. 3, showing a series of feed stations and stanchions installed along one side of the building shown in FIGS. 1, 2 and 3, as depicted in broken lines therein.
Figures 5, 6:
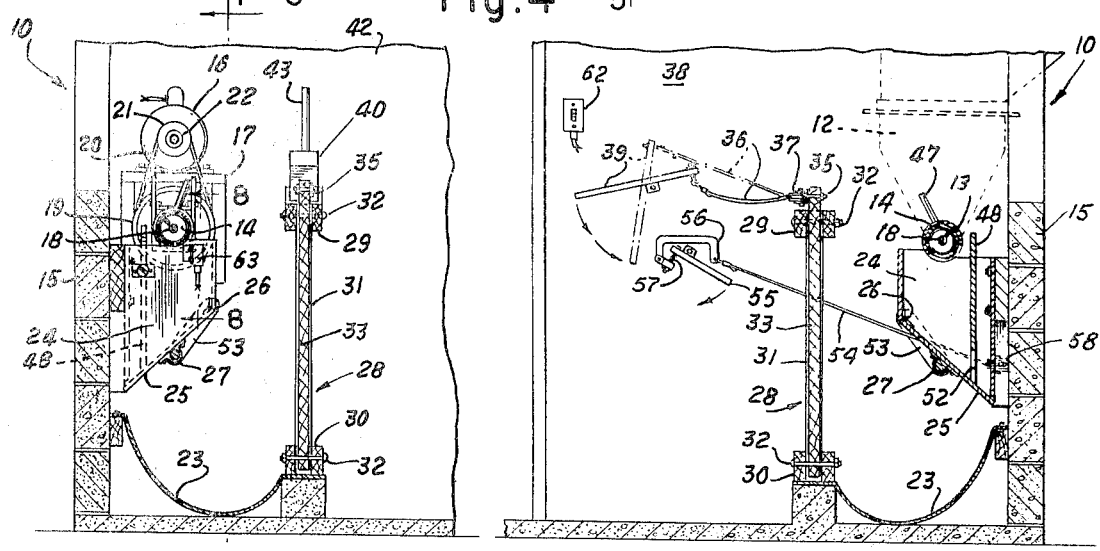
FIG. 5 is a fragmentary sectional view of the feed bunker and stanchion structure on line 5-5 of FIG. 4, showing one of the feed dispensing hoppers and the flight conveyor.
FIG. 6 is a fragmentary sectional view of the feed bunker and stanchion structure and feed dispensing hopper, as seen from the opposite direction on line 6-6 of FIG. 4, and showing the dispensing and stanchion control levers.

For convenience in describing the system and apparatus, each of the dispensers 24 is also referred to as a "station" at which each animal normally feeds, and a fence or barrier 28 is provided along the front of each of the troughs or bunkers 23 comprising upper and lower horizontal members 29 and 30 and a series of spaced vertical elements 31 which are secured at each end by bolts 32, or other suitable device, to the members 29 and 30, as shown in FIGS. 4, 5, 6 and 10. At each station, opposite each dispenser 24, is an adjustable stanchion 33 having a pivotal connection at its lower end to the lower horizontal member 30, as best shown in FIG. 4.

Each of the horizontal members 29 and 30 actually comprise two laterally spaced parallel elements secured together by the bolts 32 which extend through the ends of the vertical members 31, and this arrangement is apparent in FIGS. 4, 5, 6 and 10. The stanchions 33 extend above the members 29 and 30 and have their upper ends free to move laterally between the elements which make up the upper horizontal members 29, while their lower ends are pivoted on the bolts 32 in the lower members 30, the closed positions of the stanchions 33 being shown in broken lines in FIG. 4.

The upper ends of the stanchions 33, which extend above the members 29, are linked together by a bar 34 pivotally connected to each stanchion 33 by a bolt 35, as shown in FIGS. 4 and 10, and secured to one end of the bar 34 is a cable 36 which is passed around a pulley 37, attached to an end wall 38 of the building 10, and is connected to a lever 39 pivotally supported on the wall 38 by which the stanchions 33 are operated in unison to their "closed" positions through the cable 36 and the bar 34, as illustrated in solid and broken lines, and by the arrows, in FIG. 6.

A locking element 40 is hinged to a block 41 on the upper horizontal member 29 adjacent to the opposite end wall 42 of the building 10, as shown in FIG. 4, which is adapted to drop into place behind the last stanchion 33 to lock all of these members in their "closed" position (shown in broken lines in FIG. 4) and a handle 43 is provided on the element 40 to operate it to release the series of stanchions 33 and permit them to be moved to their "open" positions shown in solid lines in FIG. 4, the cable 36 assuming the slack condition, shown in solid lines in FIG. 6.

The conduits 13 each have a valve 44 located at each station, or over each dispenser 24, comprising a sleeve which embraces the conduits 13, and which has an opening 45 in its lower portion which is registrable with openings 46 in the conduits 13, and is capable of rotation on each conduit 13 by a lever 47 to adjust the outlet opening 45, as desired to control the amount of feed deposited in the dispensers 24 thus enabling the operator to predetermine the amount of feed to be deposited in any particular dispenser 24.

Figures 13, 14:
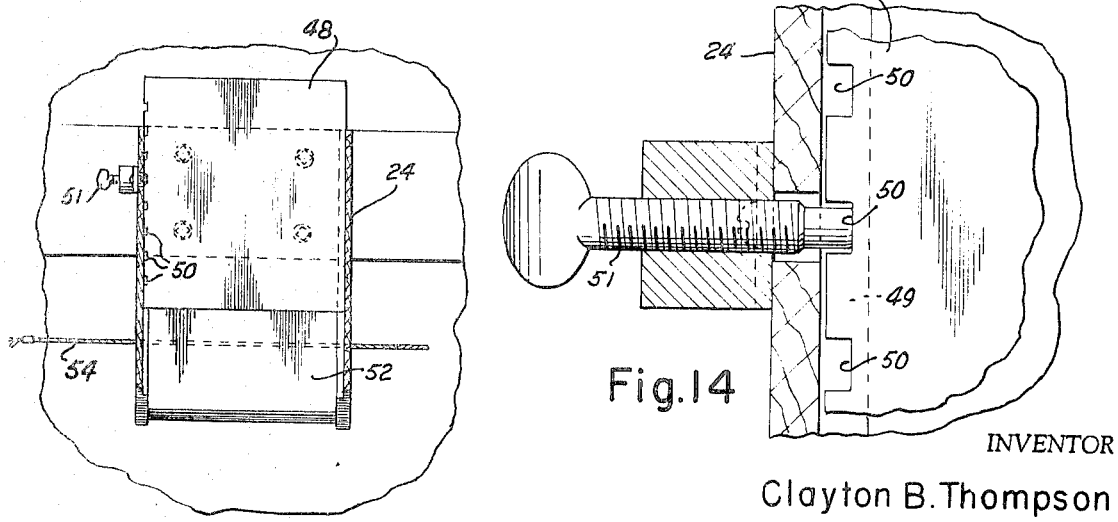
FIG. 13 is a fragmentary enlarged view, on line 13-13 of FIG. 12, showing the adjustable feed flow control panel in each dispensing hopper.
FIG. 14 is a fragmentary sectional view, on an enlarged scale, of the retention screw for securing the feed flow panel in adjusted positions.

Further, there is provided in each dispenser 24 an adjustable panel 48 which is vertically slidable in channels 49 to adjustably control the volume of feed which eventually passes into the trough or bunker 23. Having a series of notches 50 along one vertical edge engageable by a screw 51, the panel 48 can be positioned at any desired vertical level, as shown in FIGS. 12, 13 and 14, the feed, which is generally of a granulated character, passing through the opening 52 beneath the panel 48, as best shown in FIGS. 6, 12 and 13.

Figure 11:
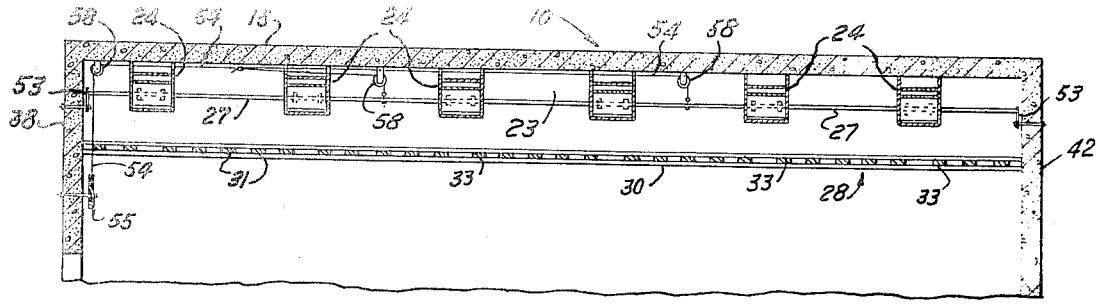
FIG. 11 is a sectional plan view of one of the feed bunkers and series of dispensing hoppers and stanchions, on line 11-11 of FIG. 4.

Each of the dispensers 24, as previously described, has a drop bottom 25 which is hinged at 26 on the front wall thereof, and is actuated to open position through the medium of a shaft 27 extending the entire length of the series, as best illustrated in FIG. 11. The shaft 27 is supported at each end by a bell-crank linkage 53, one end of which is rigidly secured to the shaft 27 while having its opposite end pivoted to the end walls 38 and 42 of the building 10, in the manner shown in FIGS. 5, 6, 7, 11 and 12. The linkages 53 have one end, opposite their connections to the shaft 27, aligned with the hinged connection 26 of the drop bottoms 25 of the dispensers 24 so that the members 25 can swing down in unison to dump the contents of the several dispensers 24 into the bunkers 23 when actuated by a cable 54 in the manner which will be presently described.

Pivotally attached to the front wall 38 of the building 10 is a lever 55 for each of the batteries of dispensers 24 and stanchions 33. To each lever 55 is connected an inverted U-shaped linkage 56 through a spring tensioned coupling 57. The cable 54 is connected at one end to one leg of the U-shaped linkage 56, as shown in FIGS. 6 and 12, and is passed over pulleys 58 secured to the walls 38 and 15 of the building 10, as shown in FIGS. 11 and 12, and is operated behind the dispensers 24. In FIG. 6 the bottoms 25 of the dispensers are shown in closed position, and the cable 54 is shown taut. In FIG. 12 the bottom 25 is shown in open position and the cable 54 is shown laxed.

Figures 12, 15, 16:
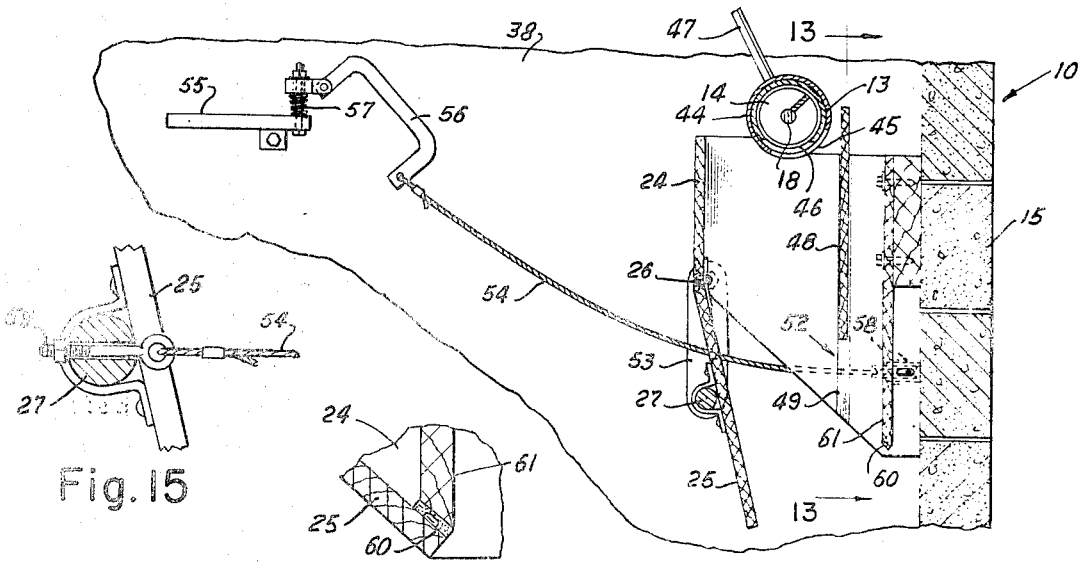
FIG. 12 is a fragmentary sectional view, on an enlarged scale, showing one of the dispensing hoppers and the feed conveyor thereabove, the hopper bottom being open, and showing the control lever and cable for collectively operating the hopper bottoms.
FIG. 15 is an enlarged sectional view through the shaft connecting the drop bottoms of the dispensing hoppers, and showing the operating cable connection.
FIG. 16 is a fragmentary view of the seal for the bottom closure of each of the dispensing hoppers.

The arrow in FIG. 6 shows the direction of the operation of the lever 55 to place the U-shaped member 56 in the position shown in FIG. 12 to cause the bottoms 25 to assume the open position depicted in this illustration. It will be noted, by reference to FIGS. 11 and 15, that the cable 54, after being passed around the pulleys 58 spaced along the wall 15, has portions connected to eyebolts 59 at spaced intervals along the shaft 27, and this device is shown in detail in the fragmentary illustration of FIG. 15.

Each of the dispensers 24 is provided with a seal 60 between the drop bottom 25 and the rear wall 61 thereof, as shown more specifically in FIGS. 12 and 16.

Feed delivered from the bins 11 through the conduits 13 by the conveyors 14 therein is in constant movement throughout the length of each bunker 23, being deposited into each of the dispensing hoppers 24 as it passes thereover. The motors 16 which operate the conveyors 14 are automatically stopped when the last of the hoppers 24, adjacent to the rear wall 42 of the building 10, by the actuation of microswitches 63 through flexible plates 64 when these elements are contacted by the level of the feed deposited in the last of the hoppers 24, or when the feed in such hoppers reaches a predetermined level.

Other means may be employed for breaking the motor circuits in predetermined cycles as desired. It is also contemplated that other suitable means for locking the stanchions 33 in their "closed" positions, instead of the member 40, previously described, may be provided.

OPERATION

In most dairy operations the dairy animals are trained to seek their assigned stations thus enabling the attendant and operator to first operate the switch 62 to start the motor 16 to convey the feed to the stations, after adjusting the valves 44 to deposit the prescribed feed portion to each animal, the panel 48 having been previously adjusted by the screw 51.

When the dispensers 24 have been filled to the desired amount the operator can actuate the lever 55 to dump the contents of each dispenser 24 into the bunker 23 at each station and, at the same time, actuate the lever 39 to close the stanchions 33 upon the animals feeding at the several stations. By the same process the animals are released after the milking operation is completed.

Although described in substantial detail, the invention is capable of certain changes and modifications in design and construction, by persons skilled in the art, without departing from the spirit and intent thereof or from the scope of the appended claims.

I claim:

1. In apparatus for feeding livestock in a closed area having side and end walls, a feed bunker arranged along a side wall having a series of spaced feed dispensers thereabove, and a feed conveyor in a conduit arranged above said dispensers and an outlet coinciding with each dispenser, in combination, a drop bottom for each dispenser having a hinge across the front thereof, the said hinges being axially aligned whereby the said bottoms are collectively operable, a shaft arranged along the series of dispensers and rigidly connected to each bottom intermediate its hinge and its free edge for collectively operating the said bottoms to open and closed positions, a link at each end of said shaft having one end connected thereto and having its opposite end pivoted to an end wall in axial alignment with the series of hinges, a cable having an end connected to said shaft and having its opposite end connected to a leg of a U-shaped linkage and having a lever for manually operating the same, the said lever being pivoted to an end wall.

2. In apparatus for dispensing feed to livestock, as described in claim 1, the said U-shaped linkage having one of its legs flexibly and pivotally connected to said lever, the said cable being connected to the opposite leg of said linkage.

3. In a livestock feeding apparatus, as described in claim 1, a panel arranged in each dispenser for vertical fixed adjustments therein for controlling the volume of feed dispensed therefrom.

4. In apparatus for feeding livestock, as described in claim 3, the assembly comprising the U-shaped linkage and lever being operable as an eccentric whereby in one position of said lever the U-shaped linkage embraces the pivotal axis of said lever and in an opposite position of said lever the linkage is extended beyond the pivoted end of said lever.